N. M. Selden,
Pie Tube,
No 83,327.   Patented Oct. 20, 1868.
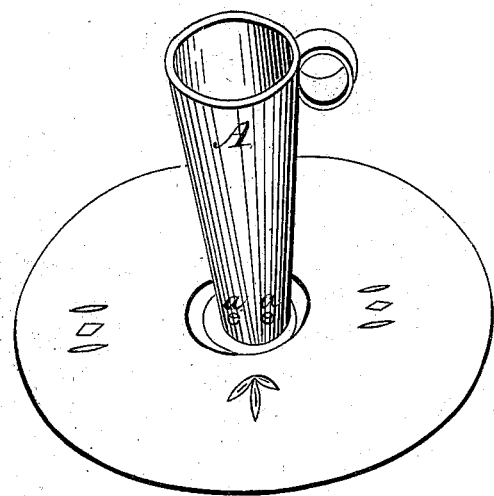
Witnesses;
Julian A. Hurdle,
Leopold Evert.
Inventor;
Nancy M. Selden,
per Alexander Mason
Atty.

MRS. NANCY M. SELDEN, OF CHATHAM, CONNECTICUT.

Letters Patent No. 83,327, dated October 20, 1868.

IMPROVED PIE-TUBE.

The Schedule referred to in these Letters Patent and making part of the same.

*To all whom it may concern:*

Be it known that I, Mrs. NANCY M. SELDEN, of the town of Chatham, in the county of Middlesex, and in the State of Connecticut, have invented certain new and useful Improvements in Baking Pastry, called a Pie-Tube; and do hereby declare that the following is a full, clear, and exact description thereof, reference being had to the accompanying drawings, and to the letters of reference marked thereon.

The nature of my invention consists in the application of a tube, to be placed in the centre of a pie, while baking the same, which will prevent the juice from coming out through the edges of the pie and soiling the plate and oven.

In order to enable others skilled in the art to which my invention appertains, to make and use the same, I will now proceed to describe its construction and operation, referring to the annexed drawings, which form a part of this specification, and which represent a perspective of my invention.

I construct a tube, A, of any suitable material, which is cone-shaped, that is, wider at the top than at the bottom. Near the bottom edge of this tube is a series of holes, *a a*.

The tube A is inserted in the centre of a pie, and the draught through the same draws the juice towards the centre, making it impossible for the juice to escape through the outer edges of the pie, thus preventing any soiling of the plate and oven, which is a great saving of labor.

Having thus fully described my invention,

What I claim as new, and desire to secure by Letters Patent, is—

As an article of manufacture, the cone-shaped tube A, provided near its lower edge with a series of holes, *a a*, substantially as and for the purposes herein set forth.

In testimony that I claim the foregoing, I have hereunto set my hand, this 14th day of September, 1868.

MRS. NANCY M. SELDEN.

Witnesses:
 EDWARD SELDEN,
 H. M. SELDEN.